(12) United States Patent
Kawaguchi

(10) Patent No.: US 8,531,350 B2
(45) Date of Patent: *Sep. 10, 2013

(54) DISPLAY CONTROL APPARATUS, AND SETTING METHOD AND PROGRAM FOR DISPLAY CONTROL APPARATUS

(75) Inventor: Zenya Kawaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,043

(22) Filed: Aug. 29, 2012

(65) Prior Publication Data

US 2012/0319925 A1  Dec. 20, 2012

Related U.S. Application Data

(63) Continuation of application No. 12/037,789, filed on Feb. 26, 2008, now Pat. No. 8,279,139.

(30) Foreign Application Priority Data

Mar. 14, 2007 (JP) ................... 2007-065395

(51) Int. Cl.
 *G09G 5/00* (2006.01)
(52) U.S. Cl.
 USPC ............. 345/1.1; 348/441; 348/445; 345/1.2; 345/3.2; 345/3.3; 345/3.4

(58) Field of Classification Search
 USPC .............................. 345/87, 204, 1.1
 See application file for complete search history.

(56) References Cited

U.S. PATENT DOCUMENTS

| | | | | | |
|---|---|---|---|---|---|
| 5,874,928 | A | * | 2/1999 | Kou | 345/1.1 |
| 5,912,710 | A | * | 6/1999 | Fujimoto | 348/445 |
| 6,118,413 | A | * | 9/2000 | Bril et al. | 345/596 |
| 7,109,974 | B2 | * | 9/2006 | Kempisty | 345/173 |
| 7,333,071 | B2 | * | 2/2008 | Baudisch et al. | 345/1.3 |
| 7,663,675 | B2 | * | 2/2010 | Miura | 348/239 |
| 2006/0221210 | A1 | * | 10/2006 | Miura | 348/239 |

FOREIGN PATENT DOCUMENTS

| | | | |
|---|---|---|---|
| JP | 2005-260740 | A | 9/2005 |
| JP | 2005260740 | A * | 9/2005 |
| JP | 2006-203848 | A | 8/2006 |
| JP | 2006-287747 | A | 10/2006 |

* cited by examiner

*Primary Examiner* — Grant Sitta
(74) *Attorney, Agent, or Firm* — Canon USA Inc IP Division

(57) ABSTRACT

When a first display device displays image data, a display control apparatus reserves a memory space having the first horizontal pixel number in the storage unit, and sets the frequency of a clock signal supplied to the display control unit to a first frequency. When a second display device displays image data, a display control apparatus reserves a space of the second horizontal pixel number, which is higher than the first horizontal pixel number, and sets the frequency of a clock signal supplied to the display control unit to a second frequency which is higher than the first frequency.

5 Claims, 4 Drawing Sheets

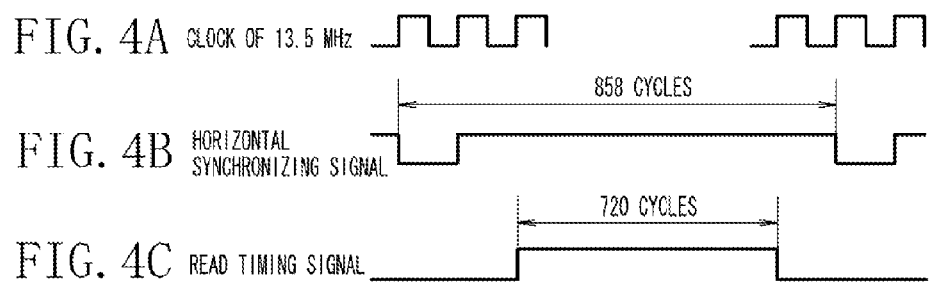
FIG. 4A CLOCK OF 13.5 MHz
FIG. 4B HORIZONTAL SYNCHRONIZING SIGNAL — 858 CYCLES
FIG. 4C READ TIMING SIGNAL — 720 CYCLES
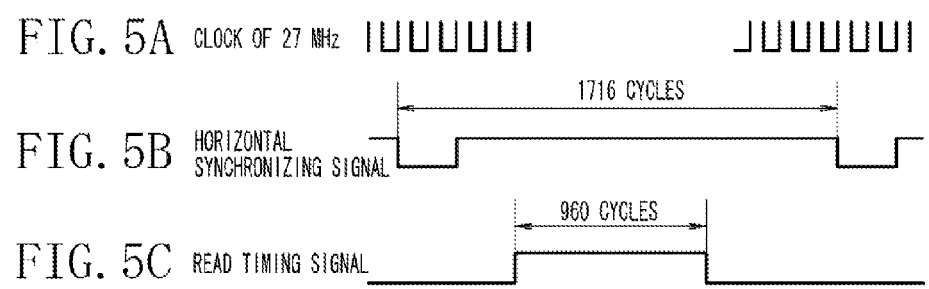
FIG. 5A CLOCK OF 27 MHz
FIG. 5B HORIZONTAL SYNCHRONIZING SIGNAL — 1716 CYCLES
FIG. 5C READ TIMING SIGNAL — 960 CYCLES FIG. 6A PRIOR ART  IMAGE DATA  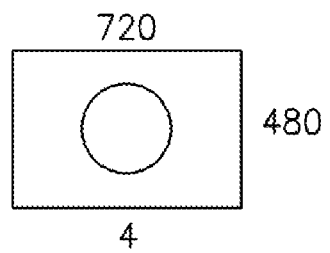
FIG. 6B PRIOR ART  NORMAL TV DISPLAY  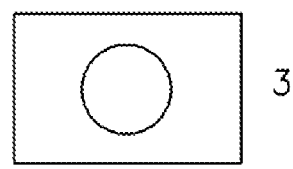
FIG. 6C PRIOR ART  WIDE LCD DISPLAY  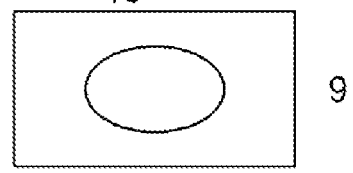

DISPLAY CONTROL APPARATUS, AND SETTING METHOD AND PROGRAM FOR DISPLAY CONTROL APPARATUS

The present application is a continuation of U.S. patent application Ser. No. 12/037,789, filed Feb. 26, 2008, entitled "DISPLAY CONTROL APPARATUS, AND SETTING METHOD AND PROGRAM FOR DISPLAY CONTROL APPARATUS", the content of which is expressly incorporated by reference herein in its entirety. Further, the present application claims priority from Japanese Patent Application No. 2007-065395 filed Mar. 14, 2007, which is hereby incorporated by reference herein in its entirety.

BACKGROUND OF THE INVENTION

1. Field of the Invention

The present invention relates to a display control apparatus for displaying image data on a display device.

2. Description of the Related Art

In general, an image pickup apparatus, e.g., a digital camera, includes a liquid crystal display (LCD) panel and a video output terminal for outputting a video signal. The image pickup apparatus can display a photographed image on the LCD panel or a television (TV) monitor connected with the video output terminal.

Further, the image pickup apparatus can display on-screen display (OSD) data on the LCD panel or the TV monitor by superimposing the data on the photographed image. The OSD data is, for example, character information such as shooting date and time of a photographed image and an icon showing an operation condition of an image pickup apparatus.

Shapes of a character and an icon are stored in a read only memory (ROM) as font data and make up the OSD data when the font data is read from ROM, corresponding to character information such as shooting date and time and an operation condition of an image pickup apparatus. In this case, it is desirable that the LCD panel and the TV monitor use the same font data in order to reduce the capacity of ROM.

An aspect ratio of a LCD panel and a TV monitor is conventionally 4:3, however, recently, a wide screen having an aspect ratio of 16:9 is widely used as a TV monitor. Further, an image pickup apparatus including an LCD panel having the aspect ratio of 16:9 is also commercialized.

In the context of the present specification, an LCD panel and a TV monitor, which have the aspect ratio of 4:3, will be respectively referred to as "a normal LCD" and "a normal TV". Further, a LCD panel and a TV monitor, which have the aspect ratio of 16:9, will be respectively referred to as "a wide LCD" and "a wide TV".

Japanese Patent Application Laid-Open No. 2002-305752 discusses an image signal processing apparatus which resizes image data obtained from an image sensor to a display size of a TV monitor and generates display data to display the resized image data on a LCD panel.

With respect to a digital camera including a wide LCD, Japanese Patent Application Laid-Open No. 2005-260740 discusses a method for mapping image data in a memory space corresponding to the aspect ratio of a TV monitor, a digital camera capable of switching a frequency of a clock signal, and an image signal generating method.

However, according to the conventional technology discussed in Japanese Patent Application Laid-Open No. 2002-305752, only a technique in which an LCD Panel and a TV monitor have the same aspect ratios is described and a technique in which the aspect ratios of an LCD panel and a TV monitor are different is not considered.

For example, in a case where a wide LCD and a normal TV are used, when the apparatus resizes image data to a display size of a normal TV having the aspect ratio of 4:3 and displays the resized image data on a wide LCD having the aspect ratio of 16:9, the wide LCD displays a horizontally enlarged image. FIGS. 6A to 6C illustrate examples of this case. FIG. 6A illustrates a resized image data, FIG. 6B illustrates the display on a normal TV, and FIG. 6C illustrates the display on a wide LCD. Although a normal TV displays a true circle image as illustrated in FIG. 6B, a wide LCD displays a horizontally enlarged ellipse image as illustrated in FIG. 6C.

In addition, OSD data has the same problem. That is, when an apparatus displays OSD data on a wide LCD having the aspect ratio of 16:9 using font data of a normal TV having the aspect ratio of 4:3, a character and an icon are horizontally enlarged, and thus they have poor viewability.

In order to address these problems, a technology using different font data in an LCD panel and a TV monitor can be considered, but there arises a new problem that a capacity of ROM for storing font data increases.

In addition, the conventional technology discussed in Japanese Patent Application Laid-Open No. 2005-260740 does not consider display of OSD data.

SUMMARY OF THE INVENTION

The present invention is directed to a technology capable of properly displaying image data on a plurality of display devices having different aspect ratios in a simple configuration.

According to an aspect of the present invention, a display control apparatus includes a storage unit, a display control unit, and a setting unit. The storage unit is configured to store image data. The display control unit is connected with at least one of a first display device and a second display device, reads the image data stored in the storage unit based on a supplied clock signal, and outputs the image data to the first display device or the second display device, wherein the first display device displays image data having a first aspect ratio based on a predetermined frequency of horizontal synchronization, and a second display device displays image data having a second aspect ratio which is larger than the first aspect ratio in a horizontal direction based on the predetermined frequency of horizontal synchronization. When the first display device displays image data, the setting unit reserves a memory space of the first horizontal pixel number in the storage unit and sets the frequency of a clock signal supplied to the display control unit to a first frequency. When the second display device displays image data, the setting unit reserves a memory space of the second horizontal pixel number which is higher than the first horizontal pixel number and sets a frequency of a clock signal supplied to the display control unit to a second frequency which is higher than the first frequency.

And according to another aspect of the present invention, a method is provided for setting a display control apparatus configured to perform control to read image data stored in a storage unit based on a set clock signal and output the image data to a display device. The method includes determining whether image data is to be displayed on a first display device or a second display device, wherein the first display device displays image data having a first aspect ratio based on the predetermined frequency of horizontal synchronization, and the second display device displays image data having a second aspect ratio that is larger than the first aspect ratio in a horizontal direction based on the predetermined frequency at horizontal synchronization; reserving a memory space having the first horizontal pixel number in the storage unit and setting the frequency of a clock signal supplied to the display control unit to a first frequency when the first display device displays image data; and reserving a memory space of the second horizontal pixel number that is higher than the first horizontal pixel number and setting the frequency of a clock signal supplied to the display control unit to a second frequency that is higher than the first frequency when the second display device displays image data.

Moreover, according to yet another aspect of the present invention, a computer readable medium is provided which contains computer-executable instructions for setting a display control apparatus configured to read image data stored in a storage unit based on a set clock signal and output the image data to a display device. Here, the medium includes computer-executable instructions for determining whether image data is to be displayed on a first display device or a second display device, wherein the first display device displays image data having a first aspect ratio based on the predetermined frequency of horizontal synchronization, and the second display device displays image data having a second aspect ratio that is larger than the first aspect ratio in a horizontal direction based on the predetermined frequency at horizontal synchronization; computer-executable instructions for reserving a memory space having the first horizontal pixel number in the storage unit and setting the frequency of a clock signal supplied to the display control unit to a first frequency when the first display device displays image data; and computer-executable instructions for reserving a memory space of the second horizontal pixel number that is higher than the first horizontal pixel number in the storage unit and setting the frequency of a clock signal supplied to the display control unit to a second frequency that is higher than the first frequency when the second display device displays image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4C are timing charts for one horizontal period when performing display on a normal TV monitor.

FIGS. 5A to 5C are timing charts for one horizontal period when performing display on a wide LCD panel.

FIGS. 6A to 6C illustrate a display when aspect ratios are different. FIG. 6A illustrates resized image data having horizontal 720 pixels and vertical 480 lines; FIG. 6B illustrates a display on a normal TV; and FIG. 6C illustrates a display on a wide LCD.

DETAILED DESCRIPTION OF THE EMBODIMENTS

Various exemplary embodiments, features, and aspects of the invention will be described below with reference to the drawings.

Figure 1:
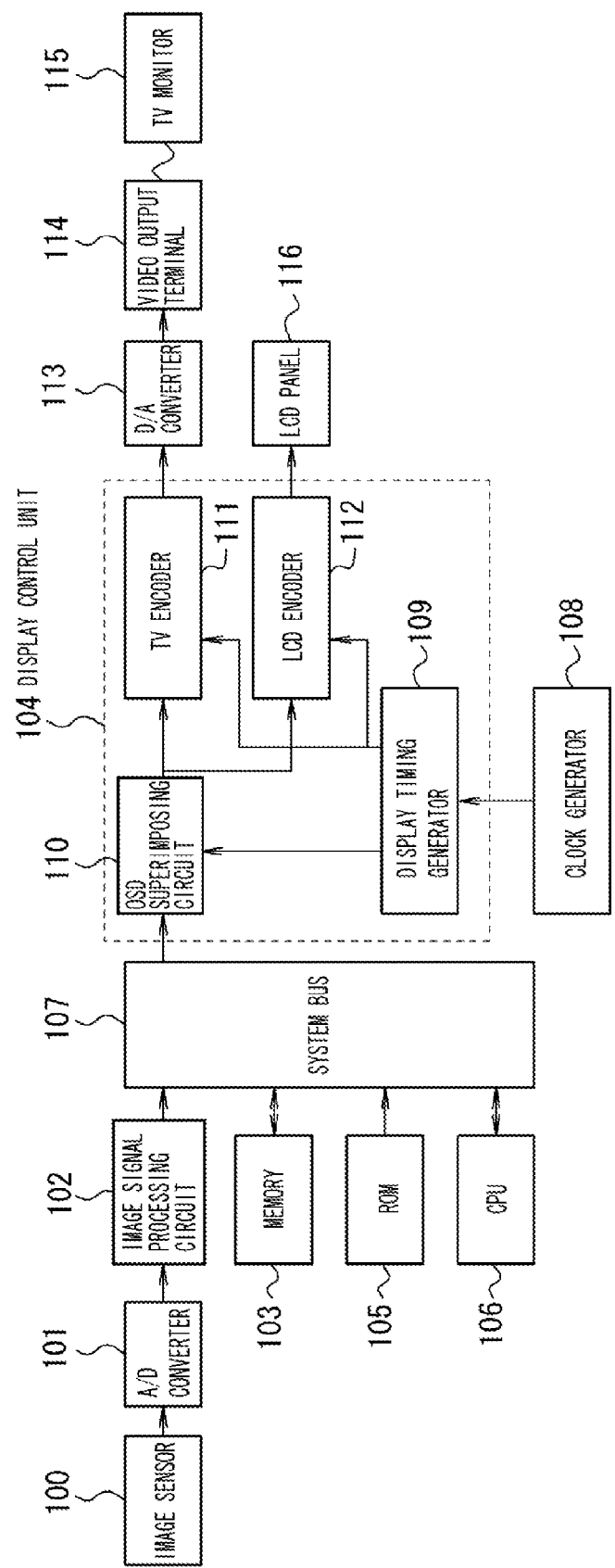
FIG. 1 is a block diagram of an example image pickup apparatus including a video signal processing apparatus according to an embodiment of the present invention.

FIG. 1 is a block diagram of an image pickup apparatus including a video signal processing apparatus according to an exemplary embodiment of the present invention. The image pickup apparatus is a digital camera or a digital video camera that includes a built-in display device and can also be connected to an external TV monitor.

In FIG. 1, an image sensor 100 converts an optical image to an electric signal. An analog-to-digital (A/D) converter 101 converts an analog image signal output from the image sensor 100 to a digital signal. An image signal processing circuit 102 performs gamma processing, interpolation processing, and matrix conversion to the digital signal output from the A/D converter 101 so as to generate YUV type image (video) data. The image signal processing circuit 102 includes a resize circuit configured to resize image data (a video signal) to a display size of a monitor.

A memory 103 temporarily stores image data (a video signal), screen display (OSD) data as additional information, and various kinds of control data. A display control unit 104 generates a video signal for displaying the signal on an LCD panel 116 and a TV monitor 115 from image data (a video signal) and OSD data stored in the memory 103. A ROM 105 stores font data such as a character and an icon to generate OSD data. The ROM 105 can be a flash memory.

A central processing unit (CPU) 106 controls operation of an image pickup apparatus. A system bus 107 connects to the image signal processing circuit 102, the memory 103, the display control unit 104, the ROM. 105, and the CPU 106. Image data or various kinds of control data are written/read via the system bus 107.

A clock generator 108 generates an operation clock of the display control unit 104. The display control unit 104 includes a display timing generator 109 to generate a synchronizing signal for display, an OSD superimpose circuit 110 to superimpose OSD data on image data, a TV encoder 111, and an LCD encoder 112.

A digital-to-analog (D/A) converter 113 converts a digital video signal output from the TV encoder 111 to an analog video signal. A video output terminal 114 is a video signal outputting unit. A TV monitor 115 is an external display device. The analog video signal output from the D/A converter 113 is displayed on the external TV monitor 115 via a video cable connected with the video output terminal 114.

An LCD panel 116 is a display device and displays a video signal output from the LCD encoder 112. And, according to the present embodiment, the TV monitor 115 is a normal TV having the aspect ratio of 4:3, and the LCD panel 116 is a wide LCD (having horizontal 960 pixels and vertical 240 lines) having the aspect ratio of 16:9.

Figure 2:
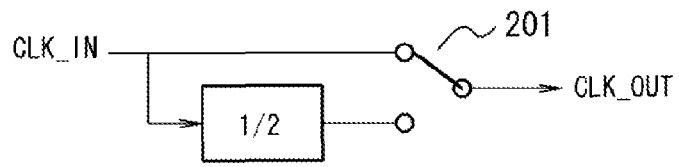
FIG. 2 illustrates an example circuit of a clock generator according to an embodiment of the present invention.

FIG. 2 illustrates a circuit of the clock generator 108. The clock generator 108 can switch the frequency of an output clock (CLK_OUT) to be equal to an input clock (CLK_IN) or ½ of the input clock (CLK_IN) using a switch 201. According to the present embodiment, the frequency of the input clock is set to 27 MHz and the CPU 106 can select the frequency of the output clock from 27 MHz and 13.5 MHz.

Further, according to the present embodiment, an analog video signal output from the video signal terminal 114 is a composite video signal of National Television Standards Committee (NTSC) system (having horizontal 720 pixels and vertical 480 lines).

An example operation of an image pickup apparatus according to the present embodiment will be described below in each case of performing display on a normal TV monitor and performing display on a wide LCD panel, including: (1)

at the time of performing display on a normal TV monitor; and (2) At the time of performing display on a wide LCD panel.

(1) At the Time of Performing Display on a Normal TV Monitor

Figure 3:
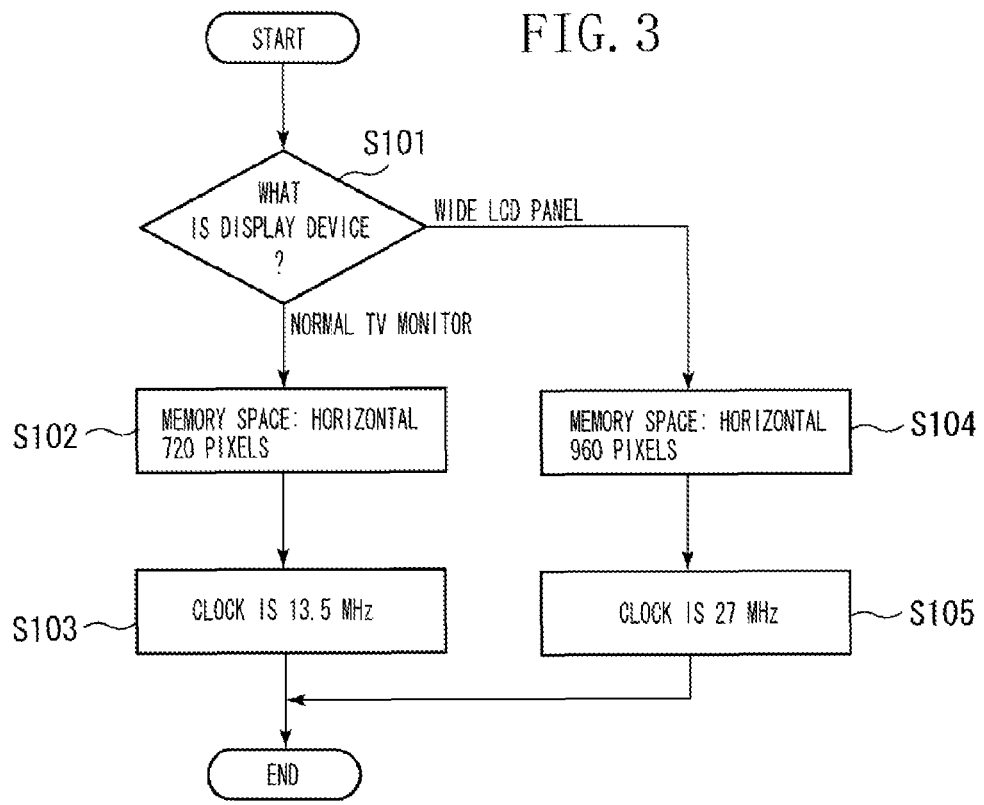
FIG. 3 is a flowchart illustrating an example operation of an image pickup apparatus in an exemplary embodiment of the present invention.

FIG. 3 is a flowchart to describe an operation of an image pickup apparatus according to the present embodiment. In step S101, the CPU 106 detects whether a video cable is inserted into the video output terminal 114 from a video cable insertion detector which is not illustrated in FIG. 1. When the video cable is inserted, the CPU 106 determines that a display device for displaying image data is a normal TV monitor, sets an operation mode of an image pickup apparatus to a normal TV display, and proceeds to step S102.

In step S102, the CPU 106 reserves a memory space A to store image data for display and a memory space B to store OSD data, in the memory 103. A size of the memory space A corresponds to image data having horizontal 720 pixels and vertical 480 lines. A size of the memory space B corresponds to OSD data having horizontal 720 pixels and vertical 480 lines.

In step S103, the CPU 106 sets the clock generator 108 so that an operation clock supplied to the display timing generator 109 in the display control unit 104 is 13.5 MHz.

The A/D converter 101 converts an analog image signal output from the image sensor 100 to a digital signal (image data). The converted digital signal is input into the image signal processing circuit 102. The image signal processing circuit 102 performs gamma processing, interpolation processing, and matrix conversion to the input image data, and generates YUV type image data. At this time, a resizing circuit in the image signal processing circuit 102 expands or shrinks (i.e., resizes) the generated image data at least in one direction of horizontal direction or vertical direction. In this processing, image data for display is generated corresponding to a display size of a NTSC system having horizontal 720 pixels and vertical 480 lines. Then, the memory space A in the memory 103 stores the image data for display via the system bus 107.

The CPU 106 reads font data such as a character or an icon from the ROM 105, generates OSD data showing an operation condition of an image pickup apparatus, and stores the OSD data in the memory space B of the memory 103.

An operation of the display control unit 104 will be described. The TV monitor 115 of a NTSC system performs interlace-displaying. Therefore, among 480 lines constituting image data for display and OSD data, odd-numbered 240 lines (a first field image) are read from the memory 103 in a first field, and displayed on the TV monitor 115. Further, even-number 240 lines (a second field image) are read from the memory 103 in a second field, and displayed on the TV monitor 115.

The display timing generator 109 in the display control unit 104 generates a synchronizing signal (a horizontal/vertical signal) and a read timing signal of image data for display and OSD data, based on the operation clock of 13.5 MHz.

The OSD superimposing circuit 110 in the display control unit 104 reads image data for display and OSD data from the memory 103 so as to output display data corresponding to the read timing signal, and superimposes OSD data on the image data for display.

FIGS. 4A to 4C are timing charts in one horizontal period when performing display on a normal TV monitor. In the NTSC system, the frequency of a horizontal synchronizing signal is 15.734 KHz. A horizontal synchronizing signal in FIG. 4B is generated every 858th cycle of an operation clock of 13.5 MHz (FIG. 4A). The read timing signal in FIG. 4C becomes High only during a display active period and becomes High in 720 cycles in one horizontal cycle period.

The TV encoder 111 in the display control unit 104 adds a synchronizing signal and a color burst signal to display data output from the OSD superimposing circuit 110 and outputs these data to the D/A converter 113. The external TV monitor 115 displays an analog signal output from the D/A converter 113 via a video cable connected with the video output terminal 114.

(2) At the Time of Performing Display on a Wide LCD Panel

In step S101 in FIG. 3, the CPU 106 detects whether a video cable is inserted into the video output terminal 114 from a video cable insertion detector which is not illustrated in FIG. 1. When a video cable is not inserted, the CPU 106 determines that a display device for displaying image data is a wide LCD, sets an operation mode of an image pickup apparatus to a wide LCD display, and proceeds to step S104.

In step S104, the CPU 106 reserves a memory space A to store image data for display and a memory space B to store OSD data, in the memory 103. Here, the LCD panel 116 is a wide LCD having the aspect ratio of 16:9. When a display region having the aspect ratio of 4:3 increases 4/3 times in the horizontal direction, the aspect ratio becomes 16:9 (4×4/3: 3=16:9). Therefore, the data capacity reserved in the memory space A and the memory space B increases 4/3 times compared with the data capacity when display is performed on TV monitor. That is, the size of the memory space A corresponds to image data having horizontal 960 pixels and vertical 480 lines. Further, the size of the memory B corresponds to OSD data having horizontal 960 pixels and vertical 480 lines.

In step S105, the CPU 106 sets the clock generator 108 so that an operation clock supplied to the display timing generator 109 in the display control unit 104 is 27 MHz which is twice 13.5 MHz.

The A/D converter 101 converts an analog signal output from the image sensor 100 to a digital signal (image data). The converted digital signal is output to the image video processing circuit 102. The image signal processing circuit 102 performs gamma processing, interpolation processing, and matrix conversion to the input image data, and generates YUV type image data. At this time, a resizing circuit in the image signal processing circuit 102 expands or shrinks (i.e., resizes) the generated image data at least in one direction of horizontal direction or vertical direction. In this process, image data for display is generated corresponding to horizontal 960 pixels and vertical 480 lines which is a display size having the aspect ratio of 16:9. Then, the memory space A of the memory 103 stores the image data for display via the system bus 107.

The CPU 106 reads font data such as a character or an icon from the ROM 105, generates OSD data showing an operation condition of an image pickup apparatus, and stores these OSD data in the memory space B of the memory 103. A display region of the LCD panel 116 increases horizontally 4/3 times compared with the region when display is performed on TV monitor. Correspondingly, the memory space B is also reserved horizontally 4/3 times. Thus, the CPU 106 can use the same font data when display is performed on TV monitor.

An operation of the display control unit 104 will be described. The LCD panel 116 performs progressive displaying. According to the present embodiment, the number of vertical lines of the LCD panel 116 is 240 lines which are a half of image data for display and OSD data. Therefore, among 480 lines constituting the image data for display and OSD data, only the odd-numbered 240 lines (a first field image) and only the even-numbered 240 lines (a second field image) are alternately read for every frame from the memory 103 and displayed on the LCD panel 116.

The display timing generator 109 of the display control unit 104 generates a synchronizing signal (a horizontal/vertical synchronizing signal), and a read timing signal of image data for display and OSD data based on an operation clock of 27 MHz. However, while the frequency of a synchronizing signal is the same as the frequency used when display is performed on TV monitor, a number of the cycles when the read timing signal is High, is 960 cycles (=720×4/3) which is 4/3 times TV monitor display.

The OSD superimposing circuit 110 in the display control unit 104 reads image data for display and OSD data from the memory 103 so as to output display data in correspondence with the read timing signal, and superimposes the OSD data on the image data for display.

FIGS. 5A to 5C are timing charts for one horizontal period when display is performed on a wide LCD panel. The frequency of a horizontal synchronizing signal is 15.734 KHz which is the same as that in the NTSC system, and the horizontal synchronizing signal of FIG. 5B is generated every 1716 (=858×2) cycles of an operation clock of 27 MHz (FIG. 5A). The read timing signal in FIG. 5C becomes High only in a display active period and becomes High in 960 cycles corresponding to a horizontal display size in one horizontal period.

The LCD encoder 112 of the display control unit 104 converts display data output from the OSD superimposing circuit 110 to video data that can be supplied to the LCD panel 116 by a conventional technology. The LCD panel 116 displays the image data output from the LCD encoder 112.

Accordingly, the step is carried out in which the horizontal sizes of a region that reserves the image data and the OSD data in the memory 103 are different between the conversion by the TV encoder 111 and the conversion by the LCD encoder 112. Further, the step is carried out in which the clock frequency of the clock generator 108 is different between the conversion by the TV encoder 111 and the conversion by the LCD encoder 112. By these steps, display devices having different aspect ratios can display video data including OSD data in a simple configuration.

In addition, according to the present embodiment, the number of horizontal pixels of the LCD panel 116 is 960 pixels which is the same as that of the image data for display and OSD data. However, the sizes may not necessarily be the same. If the sizes are not the same, the LCD encoder 112 can expand or shrink display data at the time of converting the display data to video data.

In addition, in step S101 of FIG. 3, the CPU 106 determines a type of display devices to change setting in a following display control. However, the determining is not limited to that method. For example, if a display device capable of outputting information of a display function can be connected, the CPU 106 can acquire aspect information from the display device and change setting in the following display control corresponding to the aspect.

The present invention can be realized by supplying a storage medium recording a program code of software which realizes the functions of the above-described embodiment, to a system or an apparatus. In this case, the system or a computer of the apparatus (or CPU or MPU) reads and executes a program code stored in the storage medium.

In this case, the program code read from the storage medium realizes functions of the above-described embodiment, and the program code itself and a storage medium storing the program code constitute the present invention.

A storage medium for supplying a program code is, for example, a floppy disk, a hard disk, an optical disk, a magneto-optical disk, a compact disk read only memory (CD-ROM), a compact disk recordable (CD-R), a magnetic tape, a nonvolatile memory card, or ROM.

Further, the present invention is not limited to the case where a computer executes a read program code so as to realize functions of the above-described embodiment. For example, the present invention includes the case where a basic system or an operating system (OS) working on a computer can perform a part or whole of actual processing so as to realize the function of the above-described embodiment.

Furthermore, according to an exemplary embodiment of the present invention, a program code read from a recording medium can be written in a memory provided in a function expansion board inserted into a computer or a function expansion unit connected with a computer. In this case, after the program code is written in the memory, a CPU provided in the function expansion board or the function expansion unit can execute a part or whole of actual processing, so that the functions of the above-described embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A display control apparatus comprising:
 a storage unit configured to store image data and on-screen display data;
 a display control unit connected with at least one of a first display device and a second display device, and configured to read the image data and on-screen display data stored in the storage unit based on a supplied clock signal, and output the image data to the first display device or the second display device and a read timing signal, superimpose the on-screen display data on the image data, wherein the first display device displays image data having a first aspect ratio based on the predetermined frequency of horizontal synchronization, and the second display device displays image data having a second aspect ratio that is larger than the first aspect ratio in a horizontal direction based on the predetermined frequency of horizontal synchronization; and
 a setting unit configured to reserve a memory space having a first horizontal pixel number, in the storage unit and set a frequency of a clock signal supplied to the display control unit to a first frequency when the first display device displays image data, and to reserve a memory space of the second horizontal pixel number that is higher than the first horizontal pixel number and set a frequency of a clock signal supplied to the display control unit to a second frequency that is higher than the first frequency when the second display device displays image data,
 wherein the display control unit generates the read timing signal which synchronizes with the first frequency clock signal and becomes predetermined level only in a display active period of the first display device when the image data and the on-screen display data are read, and generates the read timing signal which synchronizes with the second frequency clock signal and becomes predetermined level only in a display active period of the second display device when the image data and the on-screen display data are read.

2. The display control apparatus according to claim 1, the second frequency is multiple of the first frequency.

3. The display control apparatus according to claim 2, the second frequency is twice the first frequency.

4. A method for controlling a display control apparatus including a storage unit; a display control unit connected with at least one of a first display device and a second display device; and a setting unit, the method comprising:
- via the storage unit, storing image data and on-screen display data;
- via the display control unit, reading the image data stored in the storage unit based on a on a supplied clock signal, and outputting the image data and on-screen display data to the first display device or the second display device and a read timing signal, superimpose the on-screen display data on the image data;
- via the display control unit, controlling the first display device to display image data having a first aspect ratio based on the predetermined frequency of horizontal synchronization;
- via the display control unit, controlling the second display device to display image data having a second aspect ratio that is larger than the first aspect ratio in a horizontal direction based on the predetermined frequency of horizontal synchronization; and
- via the setting unit, reserving a memory space having a first horizontal pixel number, in the storage unit and setting a frequency of the supplied clock signal to a first frequency when the first display device displays image data; and
- via the setting unit, reserving another memory space having a second horizontal pixel number that is higher than the first horizontal pixel number and setting a frequency of the supplied clock signal to a second frequency that is higher than the first frequency when the second display device displays image data,
- wherein the display control unit generates the read timing signal which synchronizes with the first frequency clock signal and becomes predetermined level only in a display active period of the first display device when the image data and the on-screen display data are read, and generates the read timing signal which synchronizes with the second frequency clock signal and becomes predetermined level only in a display active period of the second display device when the image data and the on-screen display data are read.

5. A non-transitory computer readable medium containing computer-executable instructions for controlling a display control apparatus including a storage unit; a display control unit connected with at least one of a first display device and a second display device; and a setting unit, the computer readable medium comprising:
- computer-executable instructions for, via the storage unit, storing image data and on-screen display data;
- computer-executable instructions for, via the display control unit, reading the image data and on-screen display data stored in the storage unit based on a on a supplied clock signal, and outputting the image data to the first display device or the second display device and a read timing signal, superimpose the on-screen display data on the image data;
- computer-executable instructions for, via the display control unit, controlling the first display device to display image data having a first aspect ratio based on the predetermined frequency of horizontal synchronization;
- computer-executable instructions for, via the display control unit, controlling the second display device to display image data having a second aspect ratio that is larger than the first aspect ratio in a horizontal direction based on the predetermined frequency of horizontal synchronization; and
- computer-executable instructions for, via the setting unit, reserving a memory space having a first horizontal pixel number, in the storage unit and setting a frequency of the supplied clock signal to a first frequency when the first display device displays image data; and
- computer-executable instructions for, via the setting unit, reserving another memory space having a second horizontal pixel number that is higher than the first horizontal pixel number and setting a frequency of the supplied clock signal to a second frequency that is higher than the first frequency when the second display device displays image data,
- wherein the display control unit generates the read timing signal which synchronizes with the first frequency clock signal and becomes predetermined level only in a display active period of the first display device when the image data and the on-screen display data are read, and generates the read timing signal which synchronizes with the second frequency clock signal and becomes predetermined level only in a display active period of the second display device when the image data and the on-screen display data are read.

* * * * *